United States Patent
Abad

(10) Patent No.: US 7,551,849 B1
(45) Date of Patent: Jun. 23, 2009

(54) INVENTORY AND RECORD REGISTRY SYSTEM

(76) Inventor: Cris Abad, 9372 Portsmouth Dr., Huntington Beach, CA (US) 92646

(*) Notice: Subject to any disclaimer, the term of this patent is extended or adjusted under 35 U.S.C. 154(b) by 611 days.

(21) Appl. No.: 11/405,943

(22) Filed: Apr. 17, 2006

(51) Int. Cl.
*G03B 17/24* (2006.01)
*G03B 29/00* (2006.01)
*G06Q 10/00* (2006.01)
*G06Q 40/00* (2006.01)

(52) U.S. Cl. ............................ 396/310; 396/429; 705/4; 705/28

(58) Field of Classification Search ................. 396/310, 396/321, 429; 348/207.1; 705/28, 29
See application file for complete search history.

(56) References Cited

U.S. PATENT DOCUMENTS

2002/0035522 A1* 3/2002 Pilcher ........................ 705/28
2006/0282342 A1* 12/2006 Chapman ..................... 705/28
2007/0100713 A1* 5/2007 Del Favero et al. ........... 705/29
2008/0033847 A1* 2/2008 McIntosh ..................... 705/28

* cited by examiner

*Primary Examiner*—W. B. Perkey
(74) *Attorney, Agent, or Firm*—Dennis W. Beech

(57) ABSTRACT

The present invention may be used for inventory and record registry accounting of physical property and assets. A building may be photographed at each exterior wall beginning with a main entrance and sequentially photographing each succeeding adjacent wall creating an exterior photographic record. The building may be entered and each room photographed in an ordered sequence wherein while in each room creating an interior photographic record including creating an object photographic data file. The exterior photographic record and the interior photographic record may be entered in an electronic database. A code may be assigned to each exterior photograph and an interior, floor, object and room code may be assigned to each interior photograph. A general floor plan may be entered in the electronic database. The exterior photographic record and the interior photographic record may be indexed according to the exterior code and the interior code creating an ordered database.

20 Claims, 2 Drawing Sheets

INVENTORY AND RECORD REGISTRY SYSTEM

BACKGROUND OF THE INVENTION

This invention relates to systems and methods for inventory and record registry for accountability of physical property and assets of individuals and businesses. The new system and method may allow for organized recording, itemizing, indexing, storage and retrieval of data for property and assets as evidence of the existence or fact of the recorded data for proof in for example an insurance claim or for other proof purposes.

Currently when an inventory of property, assets or documents may be needed, for example, in the event of a natural disaster, fire or other destructive event, individuals and businesses may have some records or personal memory of property and assets. In some cases documents may also be stored in a safe place, such as, a safety deposit box in a location that is not damaged. However, the amount of inventory and record keeping has been shown to be erratic or negligible in the case of individuals and incomplete in the case of businesses. Although, the use of inventory methods may be practiced in businesses, it may normally be done as part of a business accounting system. These systems and methods may not allow for or anticipate an inventory and record registry of all property and assets in a manner that accounts for the effects of a natural disaster.

SUMMARY OF THE INVENTION

The present invention is directed to methods for inventory and record registry accounting of physical property and assets. A building may be photographed at each of a plurality of exterior walls beginning with a main entrance to said building and sequentially photographing each succeeding adjacent wall creating an exterior photographic record. The building may be entered and each room photographed in an ordered sequence wherein while in each room photographing each wall in an adjacent wall in succeeding order, photographing the floor and the ceiling, and photographing each object in a room creating an interior photographic record including creating an object photographic data file. A general floor plan of the building may be prepared. The exterior photographic record and the interior photographic record may be entered in an electronic database. An exterior code may be assigned to each exterior photograph of the exterior photographic record. An interior, floor, object and room code may be assigned to each interior photograph of the interior photographic record. The general floor plan may be entered in the electronic database. The exterior photographic record and the interior photographic record may be indexed according to the exterior code and the interior, floor, object and room code creating an ordered database. A record of the ordered database may be output.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
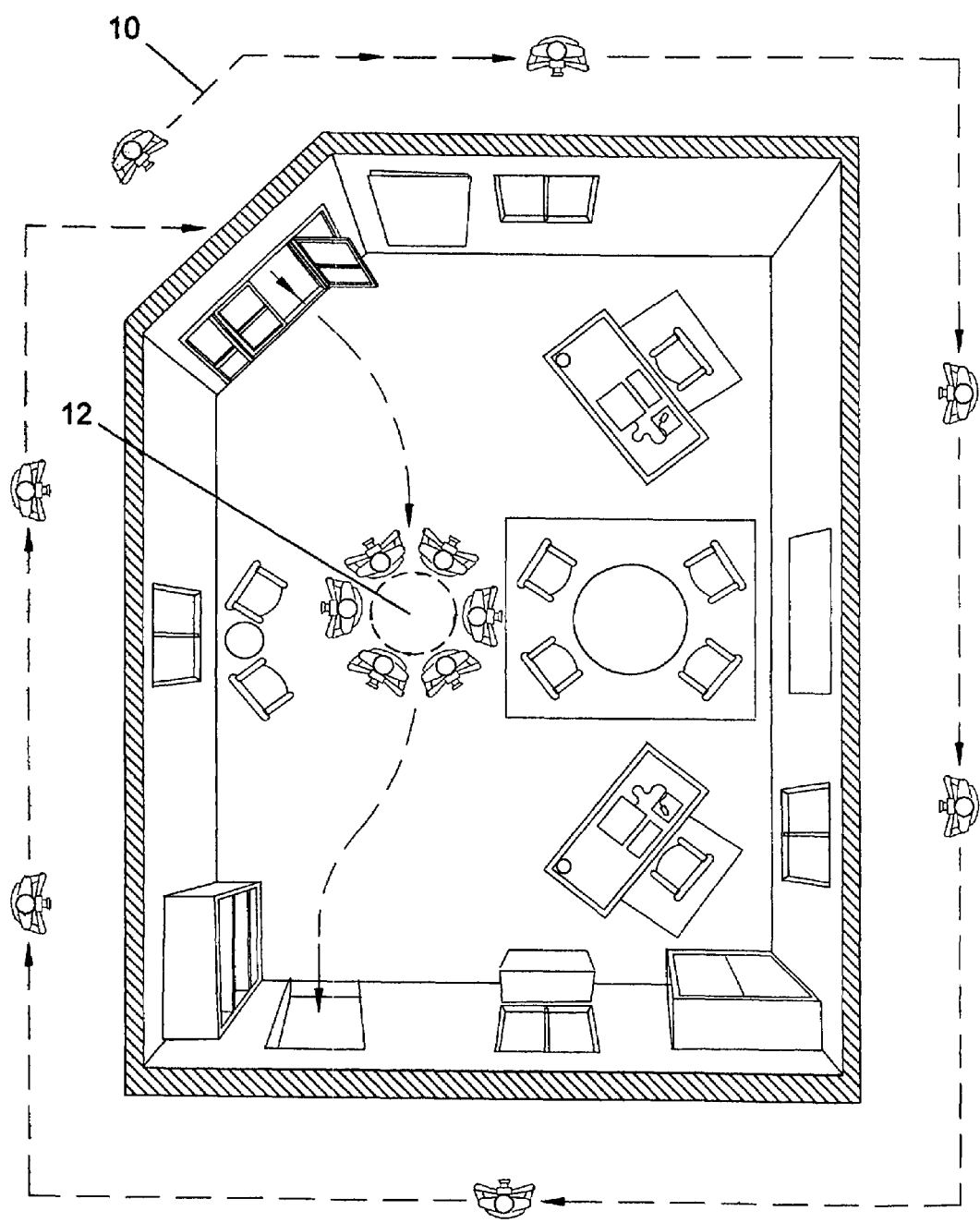
FIG. 1 illustrates a top perspective view of a photographing process according to an embodiment of the invention.
Figure 2:
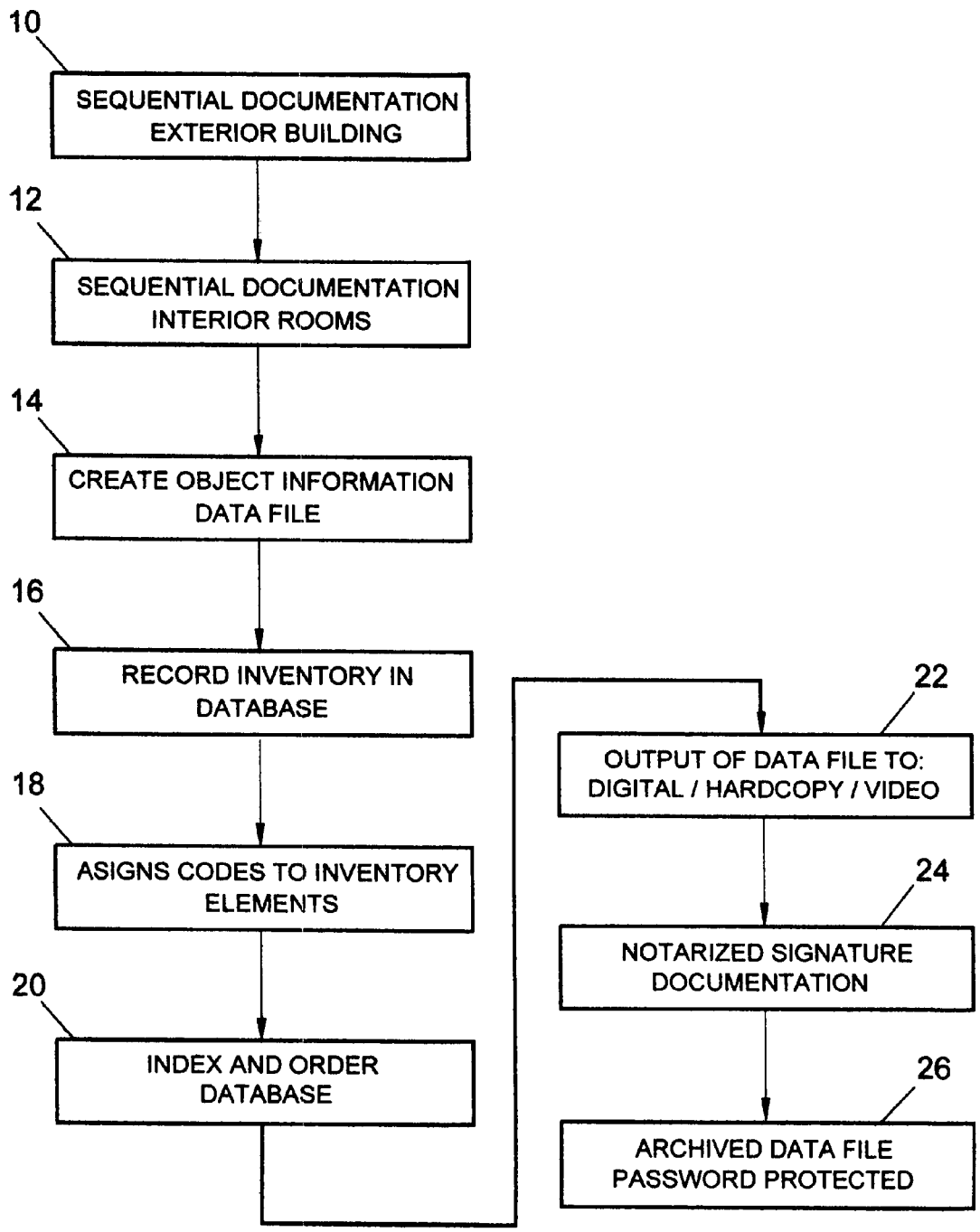
FIG. 2 illustrates a flow diagram of a method according to an embodiment of the invention.

Referring to FIGS. 1 and 2, a system and method for inventory and record registry of physical property, assets and documents may include photographing a building that may be a personal residence, a business structure or other property. The development of a record may be desired by an entity to create a reasonably complete record of property, assets and documents for use in an emergency and to have an independent record maintained in the event of a destructive event destroying property and records of the entity. The photographing may include sequential documentation of exterior building 10 by photographing the exterior walls of a building beginning with the main entrance and then sequentially photographing each succeeding adjacent wall creating an exterior photographic record. The photograph of the main entrance may include an indication of the building address. The sequential photographing may be performed by proceeding around the building in one direction, for example, clockwise or counter clockwise. This may create an exterior photographic record.

The photographing may further proceed by entering the building at a door that may be the main entrance or other location and sequentially documenting the interior of rooms 12 by photographing each room in an ordered sequence that may begin with the first room entered. The walls in each room may be photographed in an ordered sequence while in the room by moving or rotating in one direction, for example, clockwise or counterclockwise. The floor and ceiling may also be photographed. Each object in a room may be photographed individually or in groupings of objects. The photographing may create an interior photographic record that may include an object photographic data file.

An object information data file 14, may be recorded for each object photographed and may be entered with each corresponding object photographic data file. The object information data file may include available object type, size, color, serial number, manufacture name, make, model, receipt for purchase, appraisal performed by a third party, estimated value made by the owner, or other like information. The object information data file may be recorded by a photographic method.

A general floor plan of the building may be created that may be a sketch of each room that includes the objects in each room or the location of the objects. The photographic records and the floor plan may be recorded in an electronic database 16. The method for photographing may use a digital photographing device, a video recording device or other suitable recording device.

A coding system 18 using alphanumeric characters may be used to identify each exterior and interior photograph. The code system may include exterior and interior designations as well as floor for multistory buildings, rooms and objects designations, for example, IBA001 for interior, basement, room A and object 001. The codes may include directional information related to photographing, such as compass oriented direction. This coding system may be used to index and order 20 the database. The indexing may also include an inventory status for items such as objects, for example, if a photograph exists, is there an object information data file, or other like status. The coding system may include other identification and ordering elements, for example, bar coding, serializing various elements or other identification systems for record keeping and inventory procedures.

An ordered database may be output 22 by the electronic system that may be a computer to provide a printed record, a CD, DVD or magnetic tape, or other suitable output record. The ordered database may also be accessed in the computer to for example search for a particular data file for display or output. The ordered database may include a sequential page number system with initialing on each page and a signature on the last page. The signature may be notarized 24. The ordered database may also include an insurance coverage data file that may indicate what may be reimbursed in case of a loss.

An original copy of the record may be sealed and retained in a records repository 26. Access to the original copy may require use of a password and a hint question. The original copy may only be amended with a written amendment form that may include photographs of new or additional objects all of which may be appended to the original copy to preserve its integrity. The record may also be registered and maintained in a national data base.

While the invention has been particularly shown and described with respect to the illustrated embodiments thereof, it will be understood by those skilled in the art that the foregoing and other changes in form and details may be made therein without departing from the spirit and scope of the invention.

I claim:

1. A method for inventory and record registry accounting of physical property and assets comprising:
    a) photographing a building at each of a plurality of exterior walls beginning with a main entrance to said building and sequentially photographing each succeeding adjacent wall creating an exterior photographic record;
    b) entering said building and photographing each room in an ordered sequence wherein while in each room photographing each wall in an adjacent wall succeeding order, photographing the floor and the ceiling, and photographing each object in a room creating an interior photographic record including creating an object photographic data file;
    c) preparing a general floor plan of said building;
    d) entering said exterior photographic record and said interior photographic record in an electronic database;
    e) assigning an exterior code to each exterior photograph of said exterior photographic record;
    f) assigning an interior, floor, object and room code to each interior photograph of said interior photographic record;
    g) entering said general floor plan in said electronic database;
    h) indexing said exterior photographic record and said interior photographic record according to said exterior code and said interior, floor, object and room code creating an ordered database; and
    i) outputting a record of said ordered database.

2. The method as in claim 1 wherein said photographing is performed by a digital photographic device.

3. The method as in claim 1 wherein said photographing is performed by a video photographic device.

4. The method as in claim 1 wherein photographing said main entrance including photographing a building address.

5. The method as in claim 1 wherein said sequentially photographing comprising proceeding around a building in one peripheral direction.

6. The method as in claim 1 wherein entering said building is performed at said main entrance.

7. The method as in claim 1 wherein photographing each room in an ordered sequence is performed by moving in one direction in each of said rooms.

8. The method as in claim 1 wherein photographing each object in said room including photographing groupings of objects and individual objects.

9. The method as in claim 1 wherein said general floor plan including a sketch of each room and the objects in each room.

10. The method as in claim 1 wherein said record is a CD.

11. The method as in claim 1 further comprising:
    recording an object information data file for each object; and
    entering said object information data file with each object photographic data file.

12. The method as in claim 11 wherein said object information data file including at least one of a type, a size, a color, a serial number, a manufacture name, a make, a model, a receipt, an appraisal and an estimated value.

13. The method as in claim 11 wherein said recording is by a photographic method.

14. The method as in claim 1 wherein said indexing including an inventory status code.

15. The method as in claim 1 wherein said ordered database including a sequential page number, an initialing of each page and a signature on a last page.

16. The method as in claim 15 wherein said signature is notarized.

17. The method as in claim 1 wherein an original copy of said record is sealed and retained in a records depository.

18. The method as in claim 17 wherein said original copy is amended with a written amendment form and necessary photographs appended to said original copy.

19. The method as in claim 17 wherein access to said original copy is by a password and a hint question.

20. The method as in claim 1 wherein said ordered database including an insurance coverage data file.

* * * * *